United States Patent
Hecker et al.

(10) Patent No.: US 9,266,976 B2
(45) Date of Patent: Feb. 23, 2016

(54) METHOD FOR ACTIVATION OF CHROMIUM CONTAINING CATALYST PRECURSOR FOR POLYMERIZATION AND THE RESULTING POLYMERIZATION CATALYST

(75) Inventors: Manfred Hecker, Neustadt Wied (DE); Paulus De Lange, Wesseling (DE); Rainer Karer, Kaiserslautern (DE)

(73) Assignee: Basell Polyolefine GmbH, Wesseling (DE)

( * ) Notice: Subject to any disclaimer, the term of this patent is extended or adjusted under 35 U.S.C. 154(b) by 252 days.

(21) Appl. No.: 13/990,490

(22) PCT Filed: Nov. 29, 2011

(86) PCT No.: PCT/EP2011/071232
§ 371 (c)(1), (2), (4) Date: May 30, 2013

(87) PCT Pub. No.: WO2012/072605
PCT Pub. Date: Jun. 7, 2012

(65) Prior Publication Data
US 2013/0252809 A1    Sep. 26, 2013

Related U.S. Application Data

(60) Provisional application No. 61/423,237, filed on Dec. 15, 2010.

(30) Foreign Application Priority Data

Nov. 30, 2010    (EP) .................................. 10015136

(51) Int. Cl.
C08F 4/24    (2006.01)
B01J 23/26    (2006.01)
(Continued)

(52) U.S. Cl.
CPC . *C08F 4/24* (2013.01); *B01J 23/26* (2013.01); *B01J 37/14* (2013.01); *B01J 38/14* (2013.01); *B01J 38/30* (2013.01); *B01J 38/32* (2013.01); *C08F 10/00* (2013.01)

(58) Field of Classification Search
CPC ............ C08F 4/24; C08F 10/00; B01J 23/26; B01J 38/30; B01J 38/14; B01J 38/32; B01J 37/14
USPC ......................................................... 502/319
See application file for complete search history.

(56) References Cited

U.S. PATENT DOCUMENTS 3,925,258 A    12/1975    Cox
4,053,437 A *    10/1977    Liu et al. ........................ 502/256
(Continued)

FOREIGN PATENT DOCUMENTS

CN    1720269 A    1/2006
CN    1964787 A    5/2007

OTHER PUBLICATIONS

PCT International Search Report & Written Opinion mailed Jan. 16, 2012, for PCT/EP2011/071232.
(Continued)

*Primary Examiner* — Anthony J Zimmer

(57) ABSTRACT

The instant invention relates to an activation of a polymerization catalyst precursor by heat treatment comprising a support material and a catalyst precursor deposited thereon in a fluidized bed activator and to the use of the activated polymerization catalyst in the manufacture of polyolefins. The activation involves heat treatment in the presence of oxygen. After that activation the oxygen in the activator is replaced by inert gas via flushing until the fluidization gas emerging from the activator comprises oxygen in a maximum amount of up to 5 ppm. The catalyst prepared by that method is improved with respect to prevent reactor fouling during gas-phase polymerization or slurry polymerization either in stirred vessel or loop.

6 Claims, 2 Drawing Sheets

(51) Int. Cl.
*B01J 37/14* (2006.01)
*B01J 38/14* (2006.01)
*B01J 38/30* (2006.01)
*B01J 38/32* (2006.01)
*C08F 10/00* (2006.01)

(56) References Cited

U.S. PATENT DOCUMENTS

| | | | | |
|---|---|---|---|---|
| 4,441,435 | A | * | 4/1984 | Miyamoto .................... 110/245 |
| 5,189,123 | A | | 2/1993 | Gropper et al. |
| 5,200,478 | A | | 4/1993 | Vogels et al. |
| 6,372,867 | B1 | * | 4/2002 | Speakman .................... 526/106 |
| 6,559,087 | B1 | * | 5/2003 | De Lange et al. ................ 502/85 |
| 6,897,181 | B2 | * | 5/2005 | Mihan et al. .................. 502/224 |
| 7,615,510 | B2 | | 11/2009 | McDaniel et al. |
| 7,803,736 | B2 | | 9/2010 | Rohde et al. |
| 2007/0207068 | A1 | | 9/2007 | De Lange et al. |
| 2009/0198026 | A1 | * | 8/2009 | McCormick et al. ......... 526/106 |

OTHER PUBLICATIONS

Shi, Tianfeng et al., Advances in Study of Chromium Based Catalyst for Ethylene Polymerization, Shanghai Plastics, No. 4, Dec. 2003, pp. 9-13.

* cited by examiner

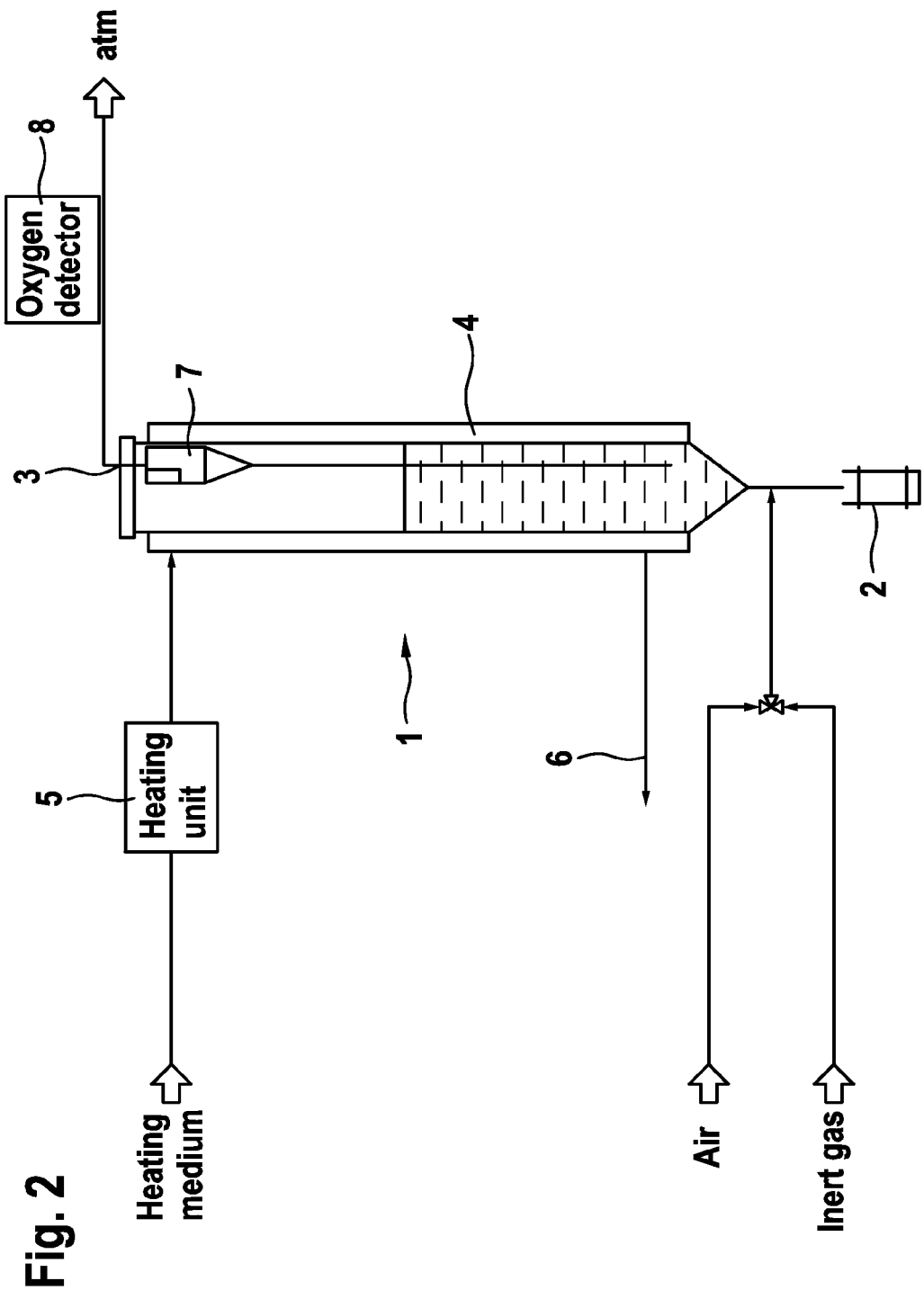

METHOD FOR ACTIVATION OF CHROMIUM CONTAINING CATALYST PRECURSOR FOR POLYMERIZATION AND THE RESULTING POLYMERIZATION CATALYST

This application is the U.S. National Phase of PCT International Application PCT/EP2011/071232, filed Nov. 29, 2011, claiming priority of European Patent Application No. 10015136.4, filed Nov. 30, 2010 and the benefit under 35 U.S.C. 119(e) of U.S. Provisional Application No. 61/423,237, filed Dec. 15, 2010, the contents of which are incorporated herein by reference in their entirety.

The present invention relates to an activation of a polymerization catalyst precursor by heat treatment comprising a support material and a catalyst precursor deposited thereon in a fluidized bed reactor and to the use of the activated polymerization catalyst in the manufacture of polyolefins.

Fluidized bed treatment is known in the art and described e.g. in EP 1 133 351. When gases flow in a vertical direction from below through a bed of finely particulate material supported on perforated plates arranged horizontally, a state similar to that of a boiling liquid becomes established under certain flow conditions. The bed throws up bubbles, and the particles of the bed material are in constant swirling up and down motion within the bed and thus remain suspended to a certain extent. For this situation, the term fluidized bed is used.

Such a state arises when a certain limiting value for the velocity of the gas flowing through the bed from below against the gravity of the solid particles is approached. This point, at which the resting bed becomes a swirling bed, the fixed bed becomes a fluidized bed, is referred to as the whirl or fluidizing point. The reaching of this point depends on a number of physical factors; these are, for example, the density, size, distribution and shape of the particles and the properties of the fluidizing liquid.

Prominent examples for methods which can be designed as fluidized-bed methods are the following:

Gas-phase polymerization, coal combustion, coal liquefaction and Fischer-Tropsch synthesis, catalytic cracking of hydrocarbons, roasting of sulfidic ores, calcination of hydrated aluminia, calcination of limestone, desulfurization of gases, catalytic dehydrogenation of benzene-rich naphthene fractions, distillation of oil from bituminous sand and several others more like incineration of waste, garbage, special waste and sewage sludge, or physical processes, such as separation of small particles or mixing.

Fluidized-bed methods for the activation of chromium containing polymerization catalyst precursor comprising a support material and a catalyst precursor deposited thereon will be considered below.

For the purposes of the instant invention, the term catalyst is preferably used for a supported catalyst. For the purposes of the invention, a supported catalyst shall mean a catalyst system comprising a support, at least one transition metal and/or at least one compound of a transition metal and, if appropriate, one or more activators.

For the activation of polymerization catalyst precursors, especially for use thereof in the polymerization of olefins, the final step in preparing the Cr-catalyst is made in a fluidized-bed reactor, from here on referred to as "activator". Thereby the particles are moved by an upwardly directed gas stream with which they are in intense material and heat exchange. During such heat treatment in the presence of air and therewith of oxygen, the particles undergo a physical/chemical change inasmuch, as the catalyst precursor comprising a Cr(III) salt, if desired in combination with other metal ions like titanium or zirconium and additives, either gaseous, liquid or solid, such as ammoniumhexafluorisilicate, is transformed into the stable Cr(VI) oxidation level which is fixed and thereby stabilized on the support material by means of oxygen bridges.

As soon as the conversion is complete, the particles are allowed to cool down to ambient temperature. During the cooling down phase the remaining air is usually removed from the reactor via flushing and replaced by an inert gas, like nitrogen or a noble gas like helium or argon.

As a difficult technical problem in gasphase polymerisation units, reactor fouling did occur from time to time. This is the non intended creation of depositions or incrustations on the reactor walls occurring during continuous polymerization process in the industrial production. Such reactor fouling was the reason for unintended and highly expensive shut downs of the respective polymerization plant for cleaning purposes. During the search for the reasons of such disadvantage, it was supposed that some impurities in the catalyst introduced somehow during the catalyst preparation would be responsible.

The technical problem of the instant invention was therefore to find an improvement in the preparation of Cr-containing polymerization catalyst, whereby a high quality catalyst should result from that improved preparation, which does not create reactor fouling any longer and which does not comprise any impurities, whatsoever.

The instant invention therefore pertains to a method for the preparation of a Cr-containing polymerization catalyst comprising a fluidized-bed method for the activation of the chromium containing catalyst precursor by heat treatment, wherein the heat treatment is performed in an activator in the presence of oxygen at a temperature in the range of from 300 to 1000° C. over a time period of from 0.5 to 48 h and wherein after that activation the oxygen in the activator is replaced by inert gas via flushing until the fluidization gas emerging from the activator does comprise oxygen in a maximum amount of up to 5 ppm, preferably up to 3 ppm, more preferred up to 2 ppm and mostly preferred up to 1 ppm.

In the simplest embodiment of the method of the instant invention, air is used as an oxygen source to oxidize Cr(III) to Cr(VI). However, other oxygen sources may also be used in addition to approach a higher oxygen concentration inside the activator.

As support material for the chromium containing catalyst precursor, aluminum oxides, silicon dioxides (silicagel), titanium dioxides, zirconium dioxides or mixed oxides or cogeles of these are suitable. Additional useful support materials may be received by modification of the pore structure, for instance with compounds of the elements bor, aluminum, silicon, phosphor or fluorine. Preferably used is a silicagel or silica cogel with oxides of Mg, Ca, B, Al, P, Ti, V, Zr and/or Zn. Preferred support materials are spherical or granular silicagels, whereby these are preferably available by spray drying.

Useful support material has preferably a specific surface in the range of from 10 to 1000 m$^2$/g, a pore volume in the range of from 0.1 bis 5 ml/g and a mean particle diameter of from 1 bis 500 μm. Preferred support material has a specific surface in the range of from 50 bis 700 m$^2$/g, a pore volume in the range of from 0.4 and 3.5 ml/g and a mean particle diameter in the range of from 5 bis 350 μm.

The method of the instant invention, is preferably performed in a cylindrical activator arranged vertically comprising tubular activator walls, a fluidization gas inlet near the bottom, a fluidization gas outlet near the top and a heat exchange jacket outside the tubular activator walls, wherein the fluidization gas emerging the activator during the cooling period is subjected to oxygen detection by means of an oxygen detector arranged behind the fluidization gas outlet after the activator.

At the fluidization gas outlet of the activator, the gas is passed through a suitable separator, by means of which entrained particles are removed in order to keep them in the reactor. Such separators can be filter elements suspended directly inside on top of the activator. The disadvantage of these filter elements is that they become blocked and therefore must be cleaned or replaced regularly.

It is advantageous to use a cyclone separator, which is essentially maintenance-free and, in contrast to a filter, has the ability to allow very fine particles to leave the activator.

Relatively fine particles are removed and/or relatively large particles are retained by means of a cyclone separator which is known in the art.

When the activation is complete, the catalyst has to be stored under oxygen free inert gas atmosphere, preferably under nitrogen or a noble gas like He or Ar or other inert gases.

BRIEF DESCRIPTION OF THE DRAWINGS

FIG. 1 shows how the temperature of the reactor goes up to the temperature of treatment and then is kept at that temperature for the whole time period for treatment. After the time period for treatment, the temperature is allowed to cool down, whereby the oxygen is replaced by nitrogen.

FIG. 2 shows schematically a cut through an activator equipped with an apparatus for oxygen detection suitable for the method of the present invention.

FIG. 2 shows the cylindrical activator (1) arranged vertically comprising a fluidization gas inlet (2) near the bottom and a fluidization gas outlet (3) near the top. Also the heat exchange jacket (4) is to see comprising a heat inlet (5) on top and a heat outlet (6) at the bottom. A cyclone (7) is arranged in the upper part of the activator (1) and an oxygen detector (8) is arranged behind the fluidization gas outlet (3).

Figure 1:
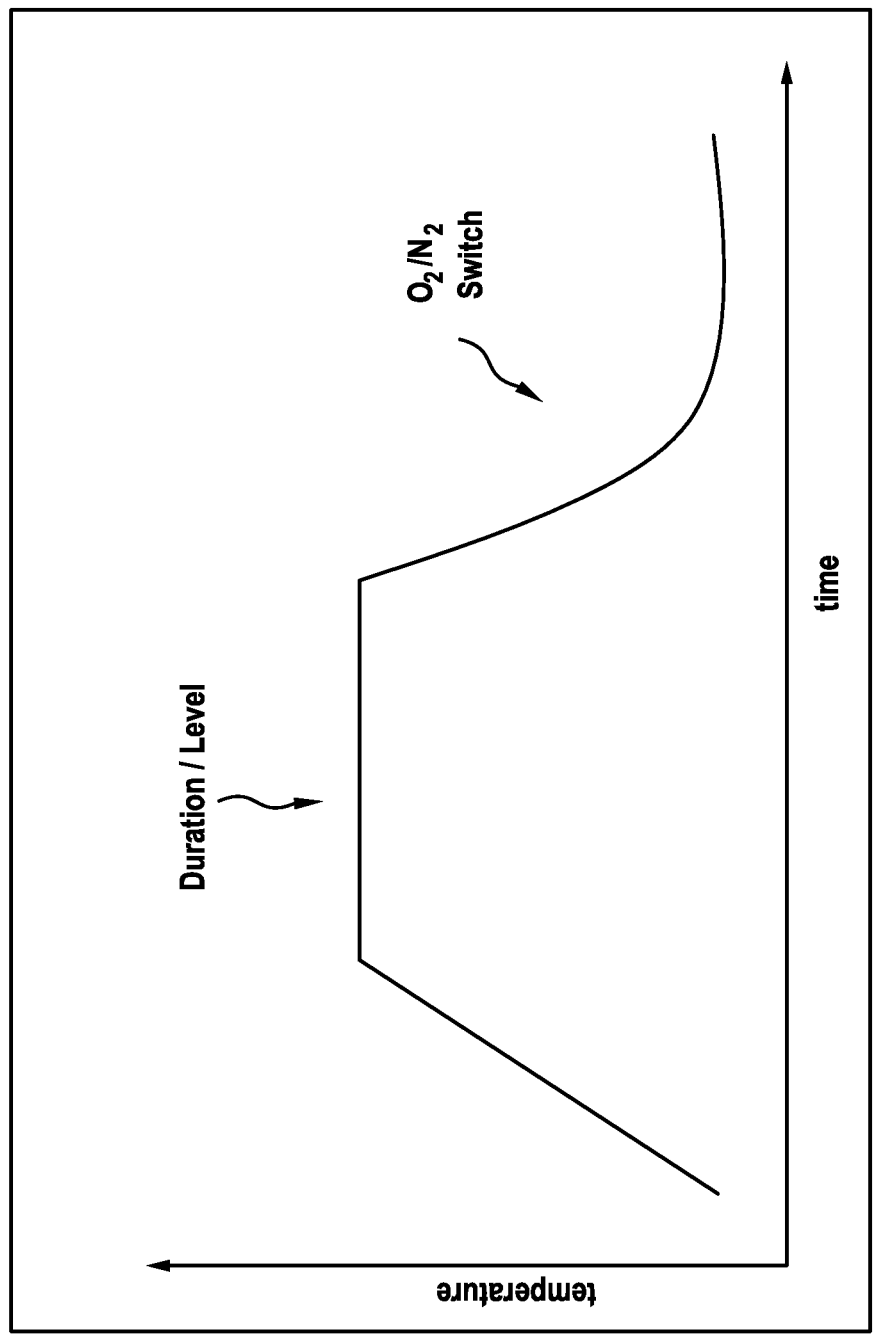
FIG. 1 shows a temperature/time diagram illustrating the method of the instant invention.

The catalyst prepared by the method according to the invention is employed, in particular, in the polymerization of olefins. For that purpose, the catalyst is generally fed to a polymerization reactor in the form of solid particles. The active components used are chromium or titanium, preferably chromium. Examples of support materials have been mentioned before in terms of their chemical composition, their pore volume and the particle diameters. Further possible support materials are fluorinated silica, fluorinated alumina, fluorinated silica-alumina, boron oxides or mixtures thereof.

The catalyst prepared by the method according to the invention is employed, in particular, in the polymerization of ethylene or in the copolymerization of ethylene with other 1-olefins having from 3 to 10 carbon atoms, preferably with propylene, 1-butene or 1-hexene. Such polymerization may be performed in gas-phase or slurry, whereby for the slurry polymerization stirred vessel reactors or loop reactors are very useful.

During the activation, in addition to the fluidizing gas introduced through the fluidization gas inlet (2), additional gases and, in addition to the originally introduced particles of catalyst precursor, additional solid can also be introduced into the fluidized bed. This introduction can take place at any time during the process and through feed points installed at any desired locations. Examples of suitable additional gases are oxygen, carbon dioxide or steam, while examples of additional solids which can be employed are ammonium hexafluorosilicate, untreated support material or catalysts having a different physical/chemical structure. In addition, liquids, for example water, can be sprayed into the fluidized bed. Thus, liquids, additional solids and/or additional gases can also be introduced into the activator.

The treatment by the method according to the invention is described in greater detail below by means of the working examples.

Example 1 (Invention)

400 kg of a catalyst precursor having a bulk density of 250 kg/m$^3$ and a chromium content of 0.3 wt.-% were activated in a steel activator having an overall height of 8.3 m and a cylindrical diameter of 1 m.

The activator was heated from ambient temperature to 630° C. and kept there for 10 hours, with air being used both as fluidizing gas and as oxidizing agent. Thereafter the activator was allowed to cool down. During the cooling phase the fluidizing gas was switched to nitrogen at a temperature of 300° C.

During the cooling phase the oxygen detector (Typ: 'Instatrans' from Emerson Electric Co., USA, having a measurement range from 0 to 100 ppm), located behind the fluidization gas outlet was automatically activated at a temperature of 200° C. and below.

After activating the oxygen detector, the reading increased direct to 18.6 ppm. The activated catalyst was then purged with nitrogen until the oxygen detector indicated that less than 1 ppm of oxygen was remaining in the fluidization gas emerging the activator. This purging took a time period of about 7 hours. Then the fluidizing gas was turned off and the catalyst was discharged.

Subsequent polymerization with the catalyst produced thereby did not produce any reactor fouling during a continuous polymerization over a time period of six months.

Example 2 (Comparison)

400 kg of a catalyst precursor having a bulk density of 250 kg/m$^3$ and a chromium content of 0.3 wt.-% were activated in a steel activator having an overall height of 8 m and a cylindrical diameter of 1 m.

The activator was heated from ambient temperature to 630° C. and kept there for 10 hours, with air being used both as fluidizing gas and as oxidizing agent. Thereafter it was cooled down. During the cooling phase the fluidizing gas was switched to nitrogen at a temperature of 300° C.

The activated catalyst was directly discharged after reaching a temperature of 35° C. which took a time period of 2 hours. The oxygen detector behind the fluidization gas outlet indicated a residual oxygen content of 11.1 ppm Subsequent polymerization of ethylene in the presence of the catalyst produced thereby did produce considerable reactor fouling after a polymerization time of 2 days.

The invention claimed is:
1. A method comprising:
preparing a Cr-containing polymerization catalyst by
heat-treating a chromium catalyst precursor in a fluidized-bed method, wherein the heat treatment step is performed in an activator in the presence of oxygen at a temperature in the range of from 300 to 1000° C. over a time period of from 0.5 to 48 h,
wherein after the heat-treating step the oxygen in the activator is replaced by an inert gas during a cooling period and thereafter via flushing until a fluidization gas emerg- ing from the activator comprises oxygen in an amount up to 5 ppm and wherein the fluidization gas emerging from the activator is controlled by an oxygen detection by means of an oxygen detector arranged behind a fluidization gas outlet.

2. The method of claim 1, wherein air is used as an oxygen source to oxidize Cr(III) to Cr(VI).

3. The method of claim 1, wherein the heat-treating step is performed in a cylindrical activator arranged vertically comprising tubular activator walls, a fluidization gas inlet near the bottom, a fluidization gas outlet near the top and a heat exchange jacket outside the tubular activator walls, wherein the fluidization gas emerging the reactor during the cooling period is subjected to oxygen detection by means of an oxygen detector arranged behind the fluidization gas outlet on top of the activator.

4. The method of claim 1, further comprising polymerizing at least one olefin in the presence of the Cr-containing polymerization catalyst, wherein the Cr-containing polymerization catalyst does not produce reactor fouling during the polymerizing step.

5. The method of claim 4, wherein the polymerizing step is a gas-phase polymerization or a slurry polymerization in stirred vessel or loop.

6. The method of claim 4, wherein the at least one olefin is ethylene, propylene, butene, pentene, hexane, or mixtures thereof.

* * * * *